(12) United States Patent
DiTrolio

(10) Patent No.: US 12,075,937 B2
(45) Date of Patent: Sep. 3, 2024

(54) VERTICAL PIPE END CONNECTOR

(71) Applicant: Philip DiTrolio, Suwanee, GA (US)

(72) Inventor: Philip DiTrolio, Suwanee, GA (US)

( * ) Notice: Subject to any disclaimer, the term of this patent is extended or adjusted under 35 U.S.C. 154(b) by 876 days.

(21) Appl. No.: 17/099,534

(22) Filed: Nov. 16, 2020

(65) Prior Publication Data

US 2021/0068576 A1 Mar. 11, 2021

Related U.S. Application Data

(63) Continuation-in-part of application No. 29/739,477, filed on Jun. 25, 2020, now Pat. No. Des. 1,031,945, and a continuation-in-part of application No. 15/727,695, filed on Oct. 9, 2017, now Pat. No. 10,941,560.

(Continued)

(51) Int. Cl.
*A47H 1/142* (2006.01)
*E04H 1/12* (2006.01)
*F16B 7/04* (2006.01)

(52) U.S. Cl.
CPC ........... *A47H 1/142* (2013.01); *E04H 1/1272* (2013.01); *F16B 7/0433* (2013.01)

(58) Field of Classification Search
CPC . A47H 1/02; A47H 1/102; A47H 1/14; A47H 1/142; A47H 1/144; A47H 2001/021; A47H 1/122; E04B 2001/2406; E04B 2001/2409; E04B 2001/2421; E04B 2/2403; E04B 2002/0236; E04B 1/185; E04B 1/5843; Y10T 403/34; Y10T 403/342; E04H 1/1272; E04H 17/006; F16B 2200/30; F16B 7/0433; F16B 12/26; F16B 17/006; F16B 13/028
See application file for complete search history.

(56) References Cited

U.S. PATENT DOCUMENTS 409,893 A 8/1889 Wray
1,064,734 A 6/1913 Howe
(Continued)

FOREIGN PATENT DOCUMENTS

CH 483819 A * 1/1970 ......... A47B 47/0058
CN 212295405 1/2021
(Continued)

OTHER PUBLICATIONS

"Final Office Action in U.S. Appl. No. 16/931,556", mailed Jul. 20, 2022, 39 pages.
(Continued)

*Primary Examiner* — Matthew R McMahon
(74) *Attorney, Agent, or Firm* — Johnson, Marcou, Isaacs & Nix, LLC

(57) ABSTRACT

The pipe-mounted coupler enables industry standard hooks on horizontal rods and other accessories to rest at such a height as to provide uniform appearance to the top of drape walls. The pipe-mounted coupler mounts on a pipe or rod vertical end to allow one or more accessory connections to be affixed to the vertical pipe. The pipe-mounted coupler includes a locking protrusion that is insertable into a slotted opening on the pipe end to allow the pipe-mounted coupler to be secured onto the pipe end allowing minimal vertical movement or horizontal twisting.

20 Claims, 10 Drawing Sheets

Related U.S. Application Data

(60) Provisional application No. 62/946,795, filed on Dec. 11, 2019, provisional application No. 62/417,121, filed on Nov. 3, 2016.

(56) References Cited

U.S. PATENT DOCUMENTS

| | | | |
|---|---|---|---|
| 1,199,553 A | 9/1916 | Hogan | |
| 1,278,348 A | 9/1918 | Hines | |
| 1,710,468 A | 4/1929 | Louis | |
| 1,893,702 A | 1/1933 | Glenn | |
| 2,689,103 A | 9/1954 | Ackerman | |
| 3,014,717 A | 12/1961 | Borodin | |
| 3,469,810 A | 9/1969 | Dorris | |
| 3,480,243 A | 11/1969 | Summerville | |
| 3,498,576 A * | 3/1970 | Alissandratos | B65F 1/141 248/219.2 |
| 3,823,439 A | 7/1974 | Selset | |
| 3,902,817 A | 9/1975 | Meir | |
| 4,019,298 A | 4/1977 | Johnson, IV | |
| 4,036,371 A * | 7/1977 | Michel | F16B 12/02 403/231 |
| 4,261,138 A | 4/1981 | St. George Syms | |
| 4,283,035 A | 8/1981 | Ojembarrena | |
| 4,361,314 A | 11/1982 | Ohlson | |
| 4,723,384 A | 2/1988 | Mengeringhausen | |
| 4,867,598 A | 9/1989 | Winter, IV | |
| 4,951,438 A | 8/1990 | Thoresen | |
| 5,111,631 A | 5/1992 | Flood | |
| 5,289,665 A | 3/1994 | Higgins | |
| 5,291,708 A | 3/1994 | Johnson | |
| 5,421,556 A * | 6/1995 | Dodge | E04H 17/006 403/375 |
| 5,433,416 A | 7/1995 | Johnson | |
| 5,657,913 A | 8/1997 | Cucheran et al. | |
| 5,667,178 A | 9/1997 | Yang | |
| 5,680,737 A | 10/1997 | Sheipline | |
| 5,769,292 A | 6/1998 | Cucheran et al. | |
| 5,802,798 A | 9/1998 | Martens | |
| 5,911,762 A | 6/1999 | Ott | |
| 6,216,889 B1 | 4/2001 | Chang | |
| 6,375,140 B1 | 4/2002 | Shen | |
| 6,375,164 B1 * | 4/2002 | Siegler | E01F 13/028 256/1 |
| 6,530,338 B2 | 3/2003 | Okumura et al. | |
| 6,588,713 B2 | 7/2003 | Kilkenny | |
| 6,595,496 B1 * | 7/2003 | Langlie | A01K 3/005 256/10 |
| 6,595,498 B1 | 7/2003 | Andersen | |
| 6,837,016 B2 | 1/2005 | Simmons | |
| 6,840,482 B2 | 1/2005 | Downey | |
| 6,952,905 B2 | 10/2005 | Nickel | |
| 6,969,211 B2 | 11/2005 | Altman | |
| 7,198,088 B2 | 4/2007 | McMenamin | |
| 7,343,831 B1 * | 3/2008 | Tamcsin | F16B 2/08 403/396 |
| 7,861,982 B1 | 1/2011 | McClure | |
| 8,020,328 B2 | 9/2011 | Lavi | |
| 8,209,924 B2 | 7/2012 | Foley | |
| 8,209,925 B2 | 7/2012 | Foley | |
| 8,231,093 B2 | 7/2012 | Tran | |
| 8,403,280 B2 | 3/2013 | Halverson et al. | |
| 8,844,907 B1 * | 9/2014 | Davis | E04H 17/006 403/329 |
| 8,905,249 B2 | 12/2014 | Whitacre | |
| 8,925,238 B2 | 1/2015 | Anderson | |
| 9,082,324 B1 | 7/2015 | Brown et al. | |
| 9,211,027 B2 | 12/2015 | Ovist | |
| 9,271,593 B1 | 3/2016 | Chang | |
| 9,381,866 B2 | 7/2016 | Sautter et al. | |
| 9,890,506 B2 * | 2/2018 | Weiner | E01F 13/028 |
| 9,909,271 B2 | 3/2018 | Wiegel et al. | |
| 9,931,993 B2 | 4/2018 | Ward et al. | |
| 10,035,677 B2 * | 7/2018 | Chen | B65H 75/48 |
| 10,702,085 B1 | 7/2020 | Newport | |
| 10,765,247 B2 | 9/2020 | Moss | |
| 10,935,070 B2 * | 3/2021 | Klein | F16C 11/0695 |
| 11,066,870 B1 | 7/2021 | Flannery et al. | |
| 11,215,209 B2 * | 1/2022 | Ramey | A01G 9/247 |
| 11,296,648 B1 | 4/2022 | Jasmin | |
| 2002/0063248 A1 * | 5/2002 | Siegler | E01F 13/028 256/37 |
| 2002/0096610 A1 | 7/2002 | Fernandez | |
| 2002/0162929 A1 | 11/2002 | Downey | |
| 2002/0178998 A1 | 12/2002 | Okumura | |
| 2003/0037662 A1 | 2/2003 | Hsieh | |
| 2005/0023403 A1 * | 2/2005 | Lu | B65H 75/4447 242/381.5 |
| 2005/0095062 A1 | 5/2005 | Iverson | |
| 2005/0098272 A1 | 5/2005 | Rizzo | |
| 2006/0165482 A1 | 7/2006 | Olberding | |
| 2006/0278777 A1 | 12/2006 | Atkinson | |
| 2007/0210293 A1 | 9/2007 | Cheng | |
| 2012/0234990 A1 * | 9/2012 | Lewis | E01F 13/00 248/219.2 |
| 2014/0082898 A1 | 3/2014 | Maunder | |
| 2015/0240515 A1 * | 8/2015 | Davis | E04H 17/21 256/1 |
| 2015/0241174 A1 | 8/2015 | Silvennoinen | |
| 2017/0349080 A1 | 12/2017 | Sautter | |
| 2018/0119410 A1 | 5/2018 | DiTrolio | |
| 2022/0136187 A1 * | 5/2022 | Thenemann | E04H 17/131 49/34 |

FOREIGN PATENT DOCUMENTS

| | | | | |
|---|---|---|---|---|
| DE | 102004059072 A1 | 6/2006 | | |
| DE | 202006001094 U1 | 6/2006 | | |
| DE | 202012004360 | 10/2012 | | |
| EP | 1384903 A1 | 1/2004 | | |
| EP | 1850045 A1 * | 10/2007 | | F16B 21/084 |
| FR | 2546953 A1 | 12/1984 | | |
| GB | 2302852 A | 2/1997 | | |
| WO | WO-2021010592 A1 * | 1/2021 | | A47B 47/005 |

OTHER PUBLICATIONS

"Non-Final Office Action cited in U.S. Appl. No. 17/188,118, filed Mar. 1, 2021", mailed Apr. 11, 2023, 25 pages.
"Non-Final Office Action issued in U.S. Appl. No. 16/931,556, filed Jul. 17, 2020", 15 pages.
"Non-Final Office Action issued in U.S. Appl. No. 17/188,230, filed Mar. 1, 2021", mailed Apr. 14, 2023, 81 pages.
"Notice of Allowance issued in U.S. Appl. No. 16/931,556, filed Jul. 17, 2020", 19 Pages.
U.S. Appl. No. 16/931,556 to DiTrolio, filed Jul. 17, 2020.
U.S. Appl. No. 15/727,695 to DiTrolio, filed Oct. 9, 2017.
U.S. Appl. No. 29/739,477 to DiTrolio, filed Jun. 25, 2020.
U.S. Appl. No. 17/031,274 to DiTrolio, filed Sep. 24, 2020.
1 "Non-Final Office Action issued in U.S. Appl. No. 16/931,556, filed Jul. 17, 2020", mailed Jan. 26, 2022, 33 pages.
U.S. Appl. No. 17/188,118 to DiTrolio, filed Mar. 1, 2021.
U.S. Appl. No. 17/188,230 to DiTrolio, filed Mar. 1, 2021.
"Non-Final Office Action issued in U.S. Appl. No. 17/188,230, filed Mar. 1, 2021", 24.
"Notice of Allowance issued in U.S. Appl. No. 29/739,477, filed Jun. 25, 2020".
"Final Office Action in U.S. Appl. No. 15/727,695, filed Oct. 9, 2017", mailed Aug. 21, 2020, 15 pages.
"Office Action in U.S. Appl. No. 15/727,695, filed Oct. 9, 2017", mailed Mar. 4, 2020, 16 pages.
"Final Office Action in U.S. Appl. No. 17/188,230, filed Mar. 1, 2021", mailed Oct. 11, 2023, 30 pages.
"Non-Final Office Action in U.S. Appl. No. 17/031,274, filed Sep. 24, 2020", mailed Oct. 19, 2023, 70.

* cited by examiner

VERTICAL PIPE END CONNECTOR

CROSS-REFERENCE TO RELATED APPLICATIONS

This application is a continuation-in-part of and claims priority to U.S. application Ser. No. 15/727,695, filed Oct. 9, 2017, and entitled "Connector for Pipes" which claims priority to U.S. Provisional Patent Application No. 62/417,121, filed Nov. 3, 2016, and entitled "Coupler for Pipes." This application also claims priority to U.S. Provisional Application No. 62/946,795, filed Dec. 11, 2019, and entitled "Vertical Pipe End Connector." This application is also a continuation-in-part of and claims priority to U.S. Design application Ser. No. 29/739,477 filed Jun. 25, 2020, and entitled "Connector Accessory for Pipes." The entire contents of the above-identified applications are hereby fully incorporated herein by reference.

FIELD OF INVENTION

The present invention relates to couplers for drape rods of the type typically found in exhibit booths. In even greater particularity, the present invention relates to a coupler adaptor to affix to an end of a vertical pipe to allow accessories to be mounted.

BACKGROUND

In the prior art, exhibit booths and the like are constructed using a tubular framework supporting drapes as walls and or covers. Many of these booths are constructed using a hook-and-slot system, which utilize upright aluminum poles with slots formed near the top regions thereof for receiving hooks secured to and extending from the ends of horizontally-positioned tubular rods. Draping material is placed over the horizontal rods to form booths or partitions as may be required. Pipe and drape walls traditionally have a bumpy appearance due to the height difference of the vertical members in relation to the top of horizontally disposed connecting rods. Additionally, the steel hooks on industry standard horizontal drape rods have a tendency to "tear" the aluminum vertical uprights in a "can opener" effect when the steel hooks are inserted in the existing slots in the uprights.

SUMMARY OF THE INVENTION

The present pipe-mounted coupler enables industry standard hooks on horizontal rods and other accessories to rest at such a height as to provide uniform appearance to the top of drape walls. A further object is to allow a pipe-mounted coupler to mount on a pipe or rod vertical end to allow one or more accessory connections to be affixed to the vertical pipe. The pipe-mounted coupler includes a locking protrusion that is insertable into a slotted opening on the pipe end to allow the pipe-mounted coupler to be secured onto the pipe end allowing minimal vertical movement or horizontal twisting.

A further object is to allow multiple horizontal rods to be mounted in parallel from a single vertical pipe. The pipe-mounted coupler prevents the steel hooks on industry standard horizontal drape rods from "tearing" into the support pipes. The pipe-mounted coupler allows accessories for the industry standard hooks to be inserted at a wider angle of insertion and to allow easier connection as compared to the narrow industry standard slots. The pipe-mounted coupler accomplishes the foregoing benefits using industry standard fasteners or hooks.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

Referring to the drawings, which are appended hereto and which form a portion of this disclosure, it may be seen that.

DETAILED DESCRIPTION

The example embodiments described herein provide a pipe-mounted coupler 40 that supports a coupler 10 for connecting substantially orthogonally disposed rods to vertical support pipes in a pipe and drape exhibit booth construction. The "Pipe and Drape" industry, is a subset of exhibition and convention services in which frameworks are constructed from horizontally and vertically disposed members in such a fashion to allow draperies or curtains to hang and create division of space in convention halls or other similar areas by arranging drapery walls and booths. The pipe-mounted coupler 40 is designed to provide an improvement to form and function over the industry standard hook and slot technology, yet allowing users of existing systems to continue using their inventory of components.

The pipe-mounted coupler 40 allows accessories, such as coupler 10, to be affixed to the end of the vertical pipe. The accessories might allow a coupler 10 to be affixed to the pipe-mounted coupler 40 in an offset position. The accessories might allow a second and third coupler 10 be affixed to the pipe-mounted coupler 40 in offset positions to allow additional rods to be vertically supported. The couplers 10 may be mounted in series extending from the pipe-mounted coupler 40, in parallel on different sides of the pipe-mounted coupler 40, or in any other suitable configuration. The pipe-mounted coupler 40 allows additional rods to be connected to the top of a single vertical pipe. In examples herein, when one coupler 10 is being described, other examples that include two or more couplers 10 in any configuration may be envisioned to operate substantially similarly.

Figure 1:
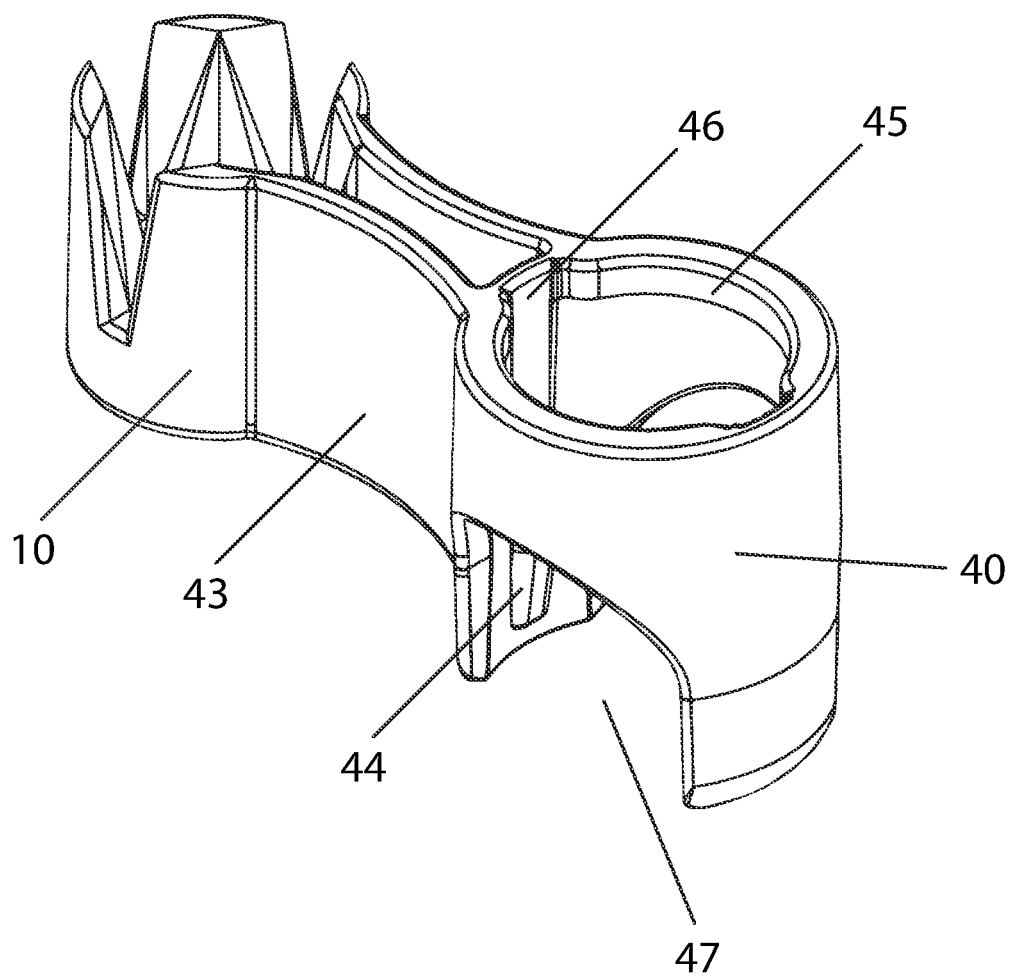
FIG. 1 is a perspective view of one embodiment of a pipe-mounted coupler.

FIG. 1 provides a perspective view of the pipe-mounted coupler 40, which is used to construct the aforesaid pipe and drape booths. Because the steel terminal hooks traditionally used on the transverse rods to connect to the vertical member are used to connect to the instant coupler 10 or other attached accessory, the steel hooks are not illustrated. The pipe-mounted coupler 40 includes features such as a locking protrusion 44, a connection bridge 43, a stop rim 45, a stop rim opening 46, an opening 47, and an accessory, such as coupler 10. Preferably, pipe-mounted coupler 40 will be made from durable reinforced polymer material, ABS plastic, Delrin, polyurethane, or some other suitable material that has sufficient strength and rigidity to effectuate the connection.

The pipe-mounted coupler 40 fits onto a vertically configured pipe, rod, or other member. The pipe, such as pipe 30 in FIG. 7, fits into the circular body of pipe-mounted coupler 40 because the inner diameter of the pipe-mounted coupler 40 is greater than the outer diameter of the pipe. The pipe may slide substantially to the top of the body of the pipe-mounted coupler 40 until the pipe meets the stop rim 45. The stop rim 45 has a smaller inner diameter than the outer diameter of the pipe, and thus the stop rim 45 prevents the pipe from protruding past the stop rim 45 and out of the body of the pipe-mounted coupler 40. The stop rim 45 includes a stop rim opening 46. The stop rim opening 46 is a break in the circular body of the stop rim 45. The stop rim opening 46 is located above the one or more locking protrusions 44. The stop rim opening 46 allows a mold or other manufacturing device to more easily release the locking protrusion 44 during manufacturing.

The locking protrusion 44 of the pipe-mounted coupler 40 protrudes into an opening of the pipe that is slightly larger than the locking protrusion 44. The opening may be a conventional slot in a pipe end for receiving industry standard hooks or other connection accessories. The pipe end may have multiple openings, such as an opening on one, two, or four sides of the pipe end. In an example, the pipe end has four openings located at each of four cardinal directions around the pipe end.

The locking protrusion 44 may be in a single position on one side of the pipe-mounted coupler 40 or may be in two positions on opposing sides of the pipe-mounted coupler 40. In an example, the locking protrusion 44 protrudes farther in the middle of the locking protrusion 44 than on the ends. That is, the locking protrusion 44 may create a ramp or slope with the center of the locking protrusion 44 sloping downward towards each opposing end of the locking protrusion 44. The locking protrusion 44, when protruding into the opening of the pipe, prevents the pipe-mounted coupler 40 from spinning on the round pipe end. The locking protrusion 44, when protruding into the opening of the pipe, also prevents the pipe-mounted coupler 40 from sliding vertically upwards or downwards on the pipe. In an example, a locking protrusion 44 is positioned on opposing sides of the pipe-mounted coupler 40.

In an example, the locking protrusion 44 is constructed of a material that is a semi-rigid plastic or similar material. In an example, because the distance between two locking mechanism 44 on opposing sides of the pipe-mounted coupler 40 is less than the outer diameter of the pipe end, the pipe-mounted coupler 40 will not slide over the pipe end without at least one element deforming or flexing. The locking protrusion 44 and/or the pipe-mounted coupler 40 may flex or deform to allow the pipe-mounted coupler 40 to fit over the pipe end. In this example, the pipe is rigid and does not deform, but the pipe-mounted coupler 40 flexes to create a larger diameter until the locking protrusion 44 slides into the opening. When the locking protrusion 44 slides into the opening of the pipe end, the pipe-mounted coupler 40 returns to the undeformed state because the locking protrusion 44 is no longer forcing the pipe-mounted coupler 40 to expand around the pipe end. When the locking protrusion 44 is in the opening, the pipe-mounted coupler 40 fits over the pipe end without deforming. In an alternate example, the pipe end deforms to allow the rigid pipe-mounted coupler 40 to slide over the pipe end. In an alternate example, both the pipe end and the pipe-mounted coupler 40 are semi-rigid and deform or flex when the pipe-mounted coupler 40 is slid over the pipe end.

The connection bridge 43 supports one or more accessories. The accessories may be a coupler 10, as illustrated in FIG. 1. The accessory may alternatively be any other type of accessory, such as a different type of hanger or support. The connection bridge 43 may be constructed out of the same material as the pipe-mounted coupler 40 or any other suitable material. In an example, the pipe-mounted coupler 40 has two or more connection bridges 43. For example, the connection bridges 43 may extend from opposing sides of the pipe-mounted coupler 40.

The accessory, such as the coupler 10, is supported by the connection bridge 43 to allow a hook and rod or other element to be affixed to the pipe. The coupler 10 may be at a height that is level with the openings in the pipe end. In another example, the coupler 10 is raised or lowered by the connection bridge 43 to be at a different height than the openings in the pipe end. In an example, the coupler 10 is raised by the connection bridge 43 to be higher than the openings on the pipe end, which allows drapes or other materials to be displayed in a layered format with one set of drapes being higher than the other.

The pipe-mounted coupler 40 includes an opening 47. As illustrated, the opening 47 is a semicircular, arched opening in the side of the pipe-mounted coupler 40. The opening 47 allows a user to have access to the pipe or rod that is inserted into the pipe-mounted coupler 40, such as pipe 30 from FIG. 7. In an example, the pipe has openings on each of four cardinal directions near the end of the pipe. The opening 47 allows a hook and rod or other element to be affixed to the pipe at the same time that the pipe-mounted coupler 40 is mounted to the pipe. The opening 47 may be located on opposing sides of the pipe-mounted coupler 40. The opening 47 may be located 90 degrees from the locking protrusion 44. In alternate examples, the opening 47 is only on one position of the pipe-mounted coupler 40. In alternate examples, the opening 47 is on three positions of the pipe-mounted coupler 40. In alternate examples, the pipe-mounted coupler 40 does not have any openings. In this example, the pipe-mounted coupler 40 may have four locking protrusions 44 at the four cardinal points of the pipe-mounted coupler 40.

Figure 2:
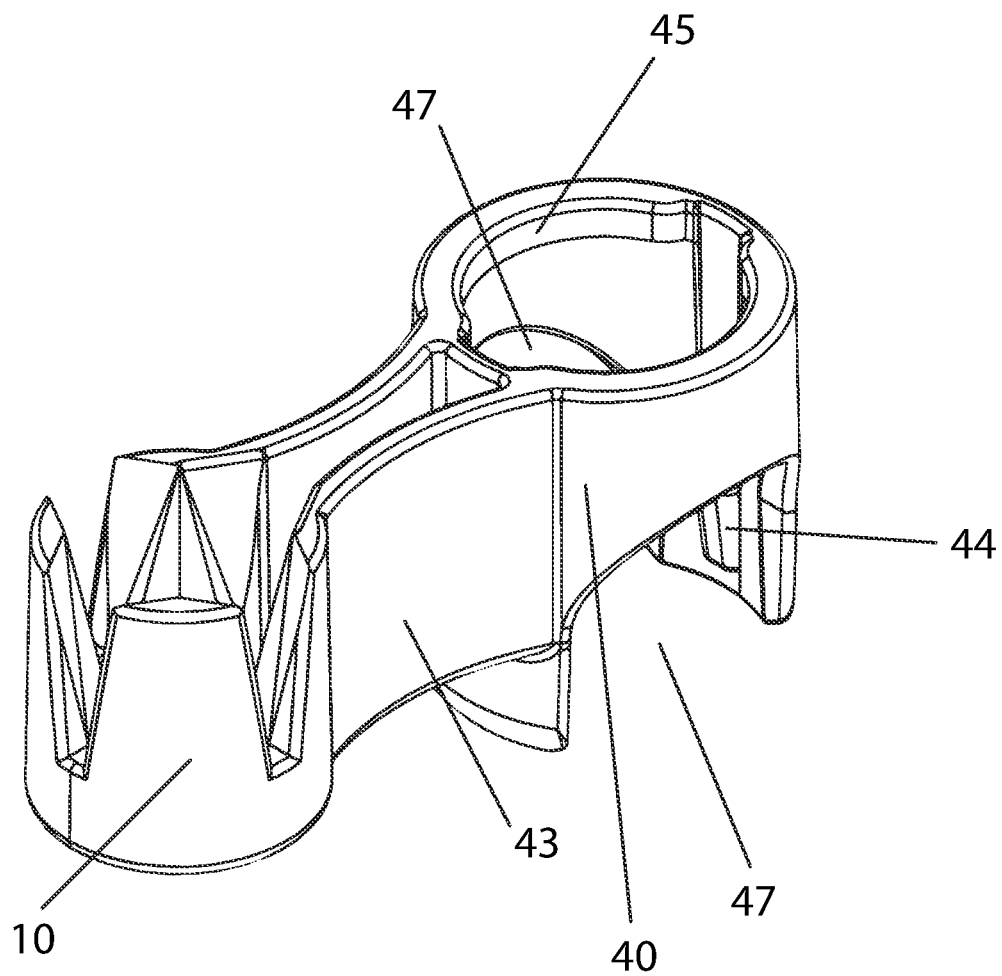
FIG. 2 is a perspective view of one embodiment of the pipe-mounted coupler.

FIG. 2 is a perspective view of one embodiment of the pipe-mounted coupler 40. The illustration includes the locking protrusion 44, the connection bridge 43, the stop rim 45, one or more openings 47, and the accessory, such as coupler 10, as described with reference to FIG. 1. An opening 47 is shown as being on two opposing sides of the pipe-mounted coupler 40 and each located 90 degrees in each direction from the locking protrusion 44.

Figure 3:
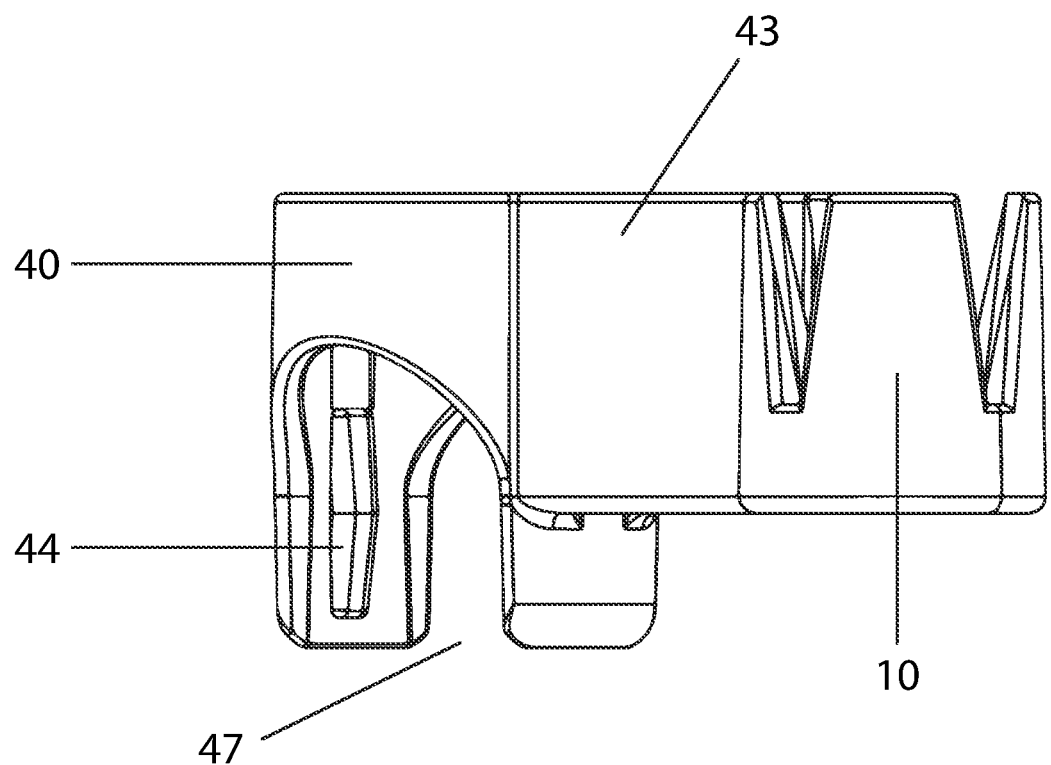
FIG. 3 is a perspective view of one embodiment of the pipe-mounted coupler.

FIG. 3 is a perspective view of one embodiment of the pipe-mounted coupler 40. The illustration includes the pipe-mounted coupler 40. The illustration includes the locking protrusion 44, the connection bridge 43, the opening 47, and an accessory, such as coupler 10, as described with reference to FIG. 1. The locking protrusion 44 is illustrated with the vertical center of the locking protrusion 44 protruding farther away from the body of the pipe-mounted coupler 40 than the top and bottom ends of the locking protrusion 44. The locking protrusion 44 slopes at an angle from the center of the locking protrusion 44 to either end of the locking protrusion 44. When inserted into an opening, the center portion of the locking protrusion 44 will insert farther into the opening than the top and bottom ends of the locking protrusion 44.

Figure 4:
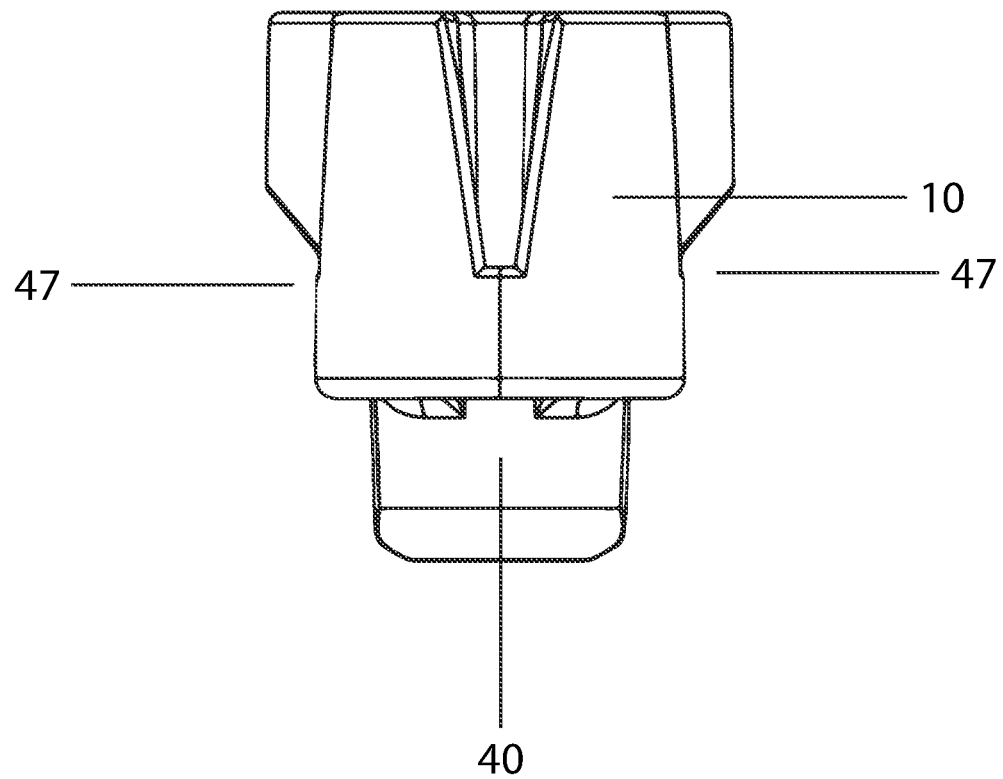
FIG. 4 is a side plan view of one embodiment of the pipe-mounted coupler.

FIG. 4 is a side view of one embodiment of the pipe-mounted coupler 40. The illustration includes one or more openings 47 and an accessory, such as coupler 10, as described with reference to FIG. 1. An opening 47 is shown as being on two opposing sides of the pipe-mounted coupler 40 and each located 90 degrees from the locking protrusion 44 (not shown).

Figure 5:
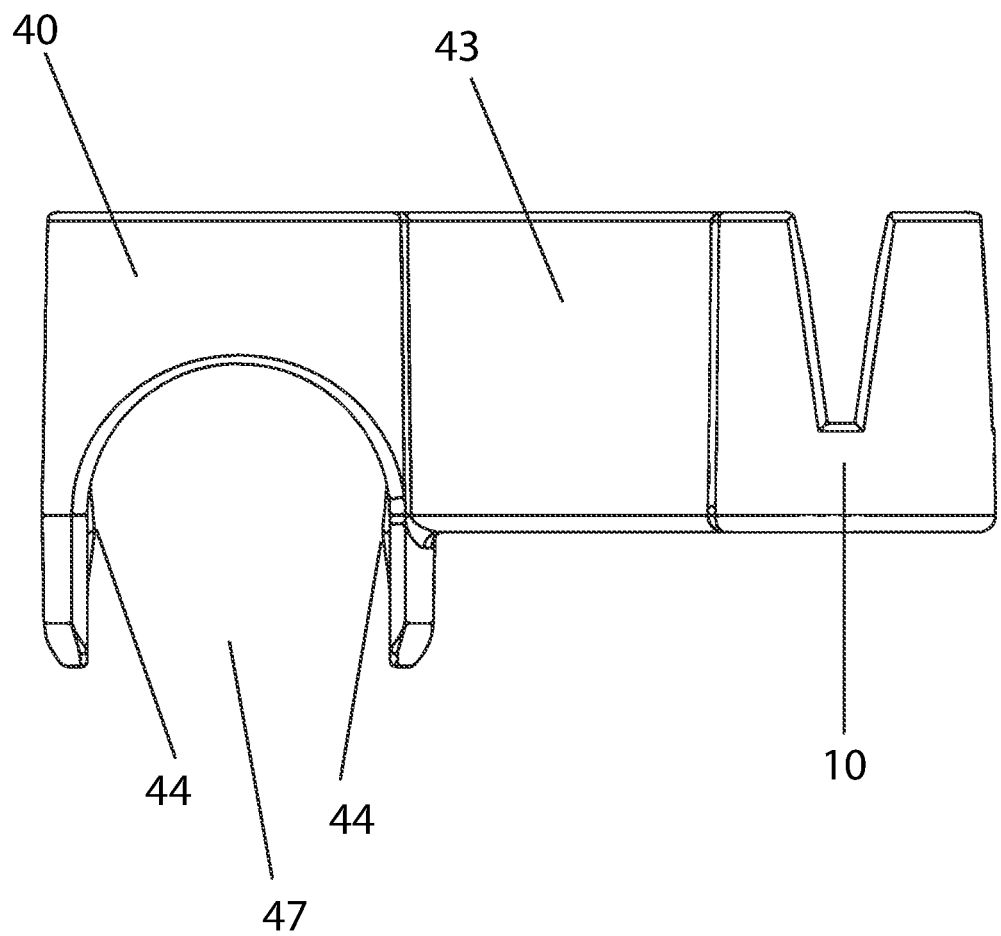
FIG. 5 is a side plan view of one embodiment of the pipe-mounted coupler.

FIG. 5 is a side view of one embodiment of the pipe-mounted coupler 40. The illustration includes the connection bridge 43, the opening 47, locking protusions 44, and an accessory, such as coupler 10, as described with reference to FIG. 1. A locking protrusion 44 is illustrated on opposing sides of the body of the pipe-mounted coupler 40. In the example, only the center portions of the locking protrusion 44 are shown because the center portions protrude farther away from the body of the pipe-mounted coupler 40 than the top and bottom ends of the locking protrusion 44.

Figure 6:
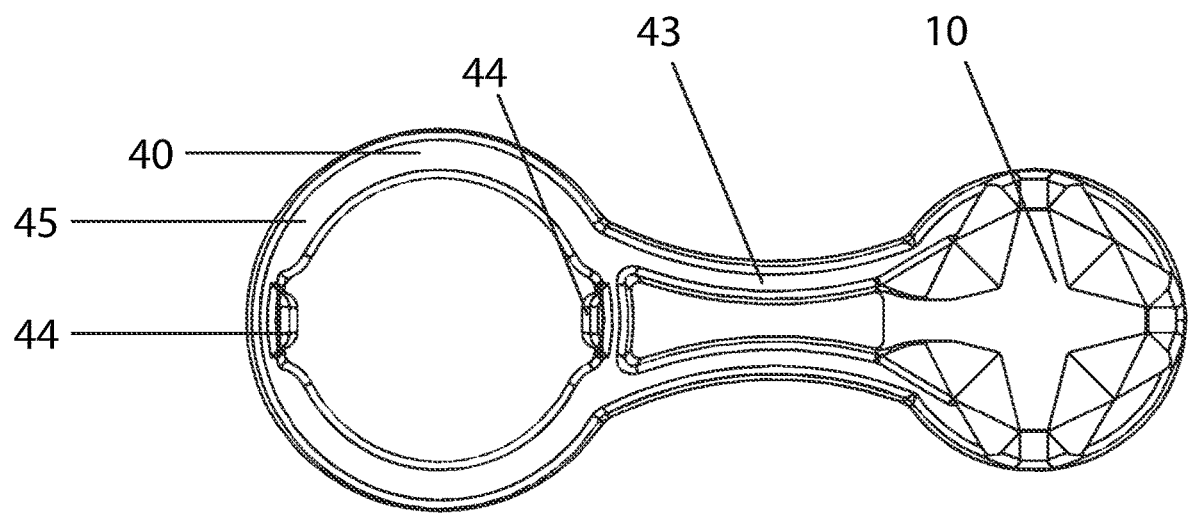
FIG. 6 is a top plan view of one embodiment of the pipe-mounted coupler.

FIG. 6 is a top view of one embodiment of the pipe-mounted coupler 40. The illustration includes the locking protrusion 44, the connection bridge 43, the stop rim 45, and an accessory, such as coupler 10, as described with reference to FIG. 1. The locking protrusion 44 is illustrated on opposing sides of the body of the pipe-mounted coupler 40.

Figure 7:
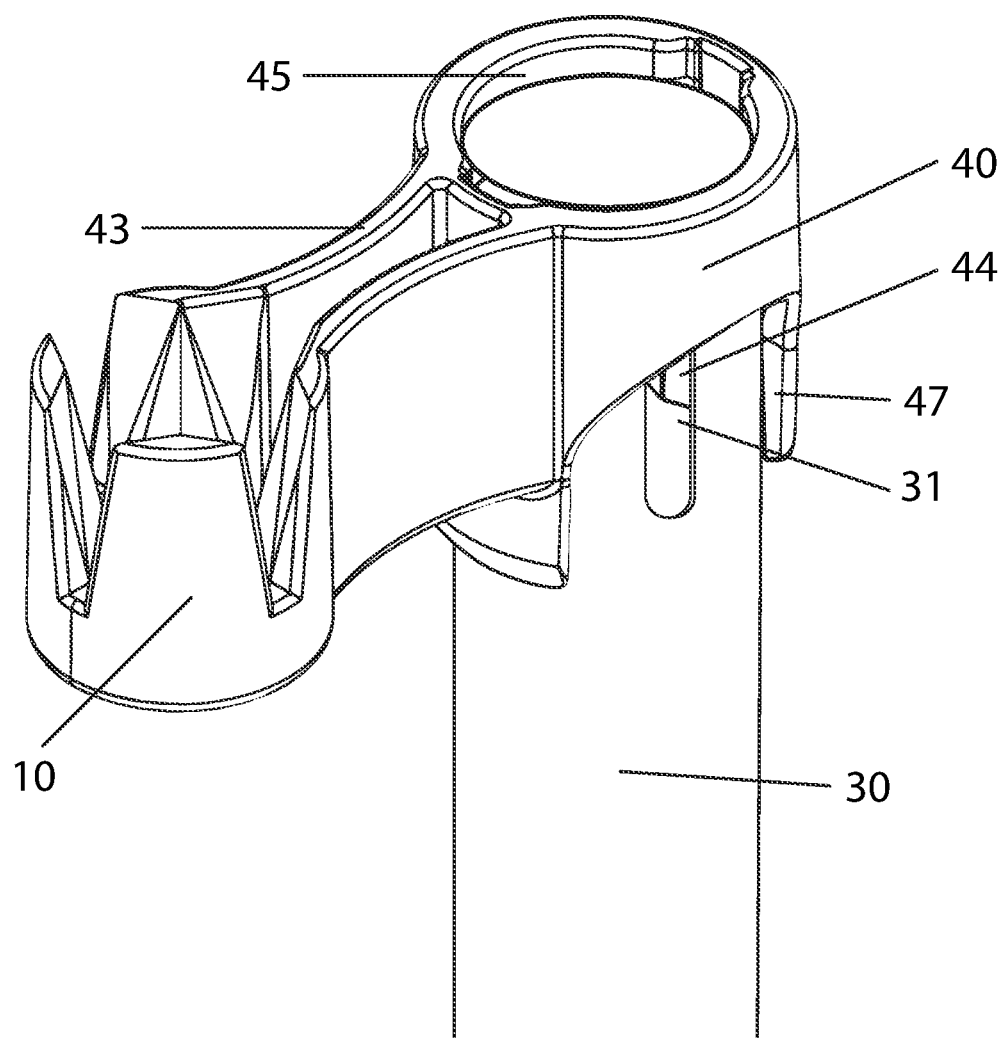
FIG. 7 is a perspective view of one embodiment of the pipe-mounted coupler affixed to a vertical mount pipe.

FIG. 7 is a perspective view of one embodiment of the pipe-mounted coupler 40 affixed to a vertical mount pipe 30. The illustration includes the locking protrusion 44, the connection bridge 43, the stop rim 45, the opening 47, and an accessory, such as coupler 10, as described with reference to FIG. 1. The pipe-mounted coupler 40 is illustrated as being mounted on a pipe 30. The pipe 30 is positioned inside the inner diameter of the pipe-mounted coupler 40, up to the stop rim 45. The stop rim 45 prevents the pipe 30 from sliding further into the pipe-mounted coupler 40. The pipe 30 is illustrated with the pipe opening 31 in at least two positions of the pipe. The two pipe openings 31 are illustrated as being 90 degrees apart around the circumference of the pipe 30. One pipe opening 31 is illustrated as being positioned adjacent to the locking protrusion 44 such that the locking protrusion 44 protrudes into the adjacent pipe opening 31. The locking protrusion 44 is visible through the unused opening 31. The protrusion locks the pipe-mounted coupler 40 in place and prevents the pipe 30 from turning inside the pipe-mounted coupler 40.

Figure 8:
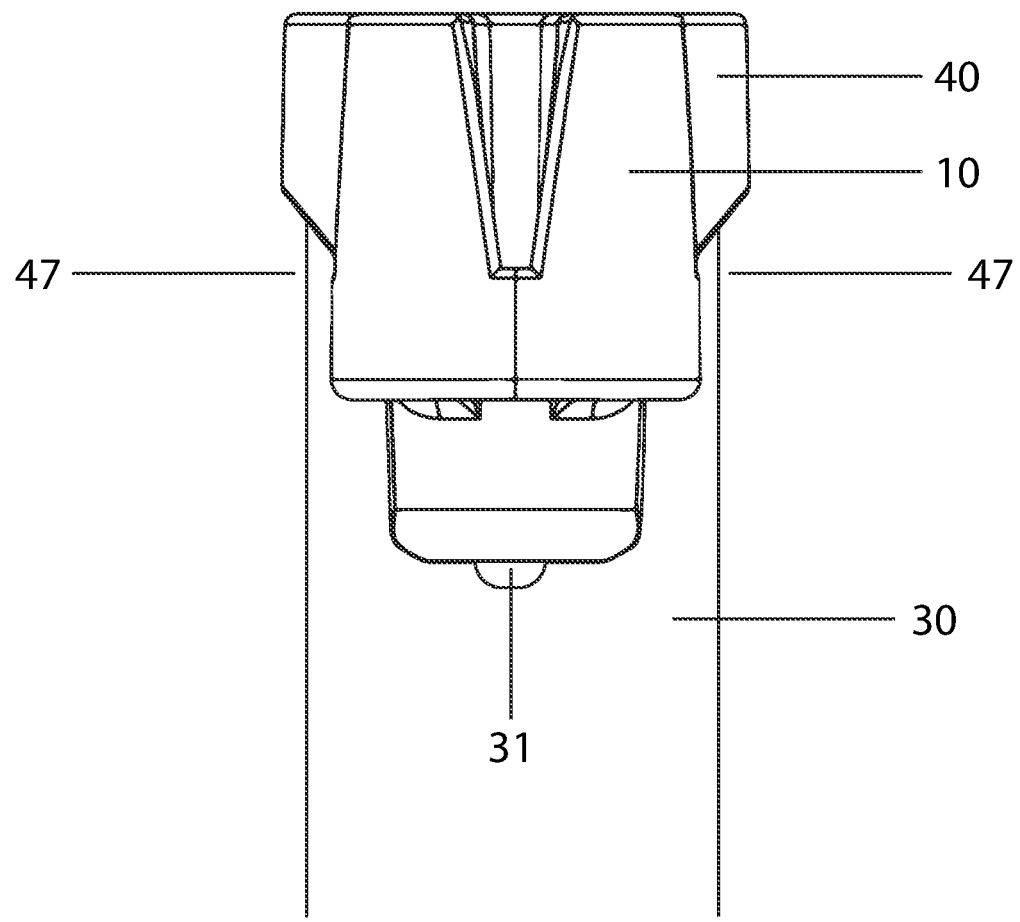
FIG. 8 is a side plan view of one embodiment of the pipe-mounted coupler affixed to a vertical mount pipe.

FIG. 8 is a side view of one embodiment of the pipe-mounted coupler 40 affixed to a vertical mount pipe 30. The illustration includes one or more openings 47, and an accessory, such as coupler 10, as described with reference to FIG. 1. The pipe-mounted coupler 40 is illustrated as being mounted on a pipe 30. The pipe 30 is illustrated with the pipe opening 31 positioned to mate with the locking protrusion 44 (not shown).

Figure 9:
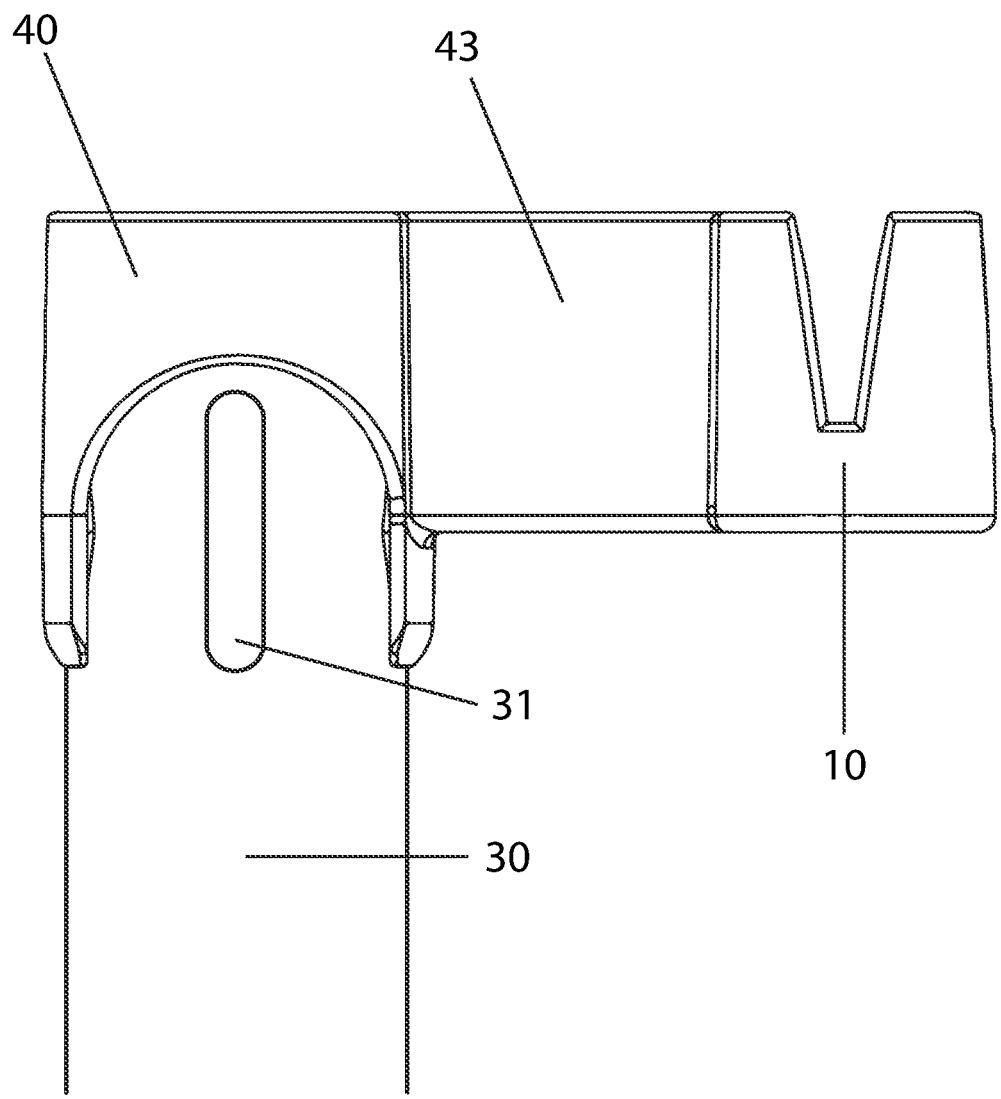
FIG. 9 is a side plan view of one embodiment of the pipe-mounted coupler affixed to a vertical mount pipe.

FIG. 9 is a side view of one embodiment of the pipe-mounted coupler 40 affixed to a vertical mount pipe 30. The illustration includes the connection bridge 43 and an accessory, such as coupler 10, as described with reference to FIG. 1. The pipe-mounted coupler 40 is illustrated as being mounted on a pipe 30. The pipe 30 is illustrated with the pipe opening 31. A second, third, or fourth pipe opening 31 may be positioned every 90 degrees around the circumference of the pipe 30 or in any other suitable configuration. For example, a pipe opening 31 may be positioned to mate with one or more locking protrusions 44 (not shown).

Figure 10:
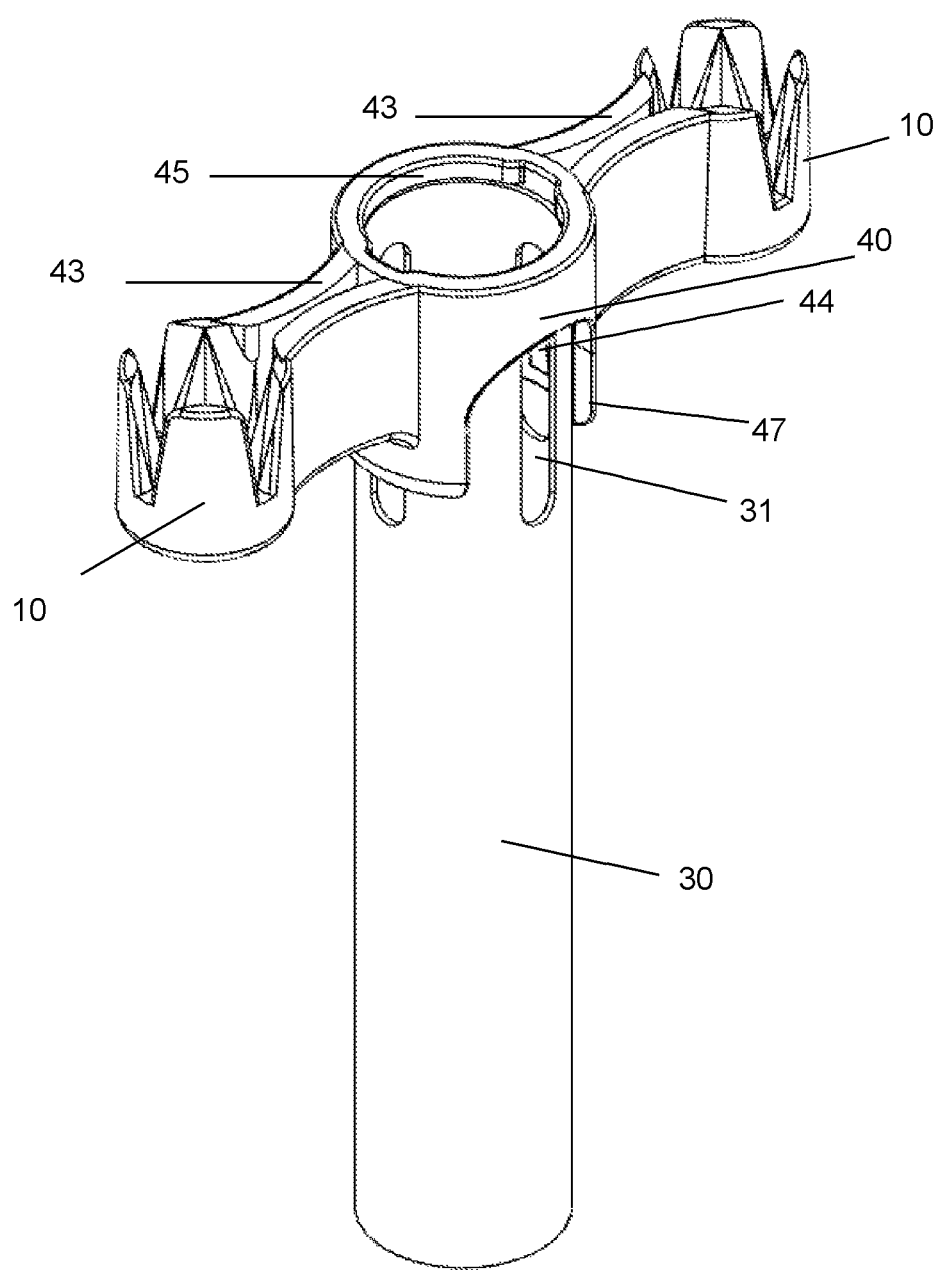
FIG. 10 is a perspective view of one embodiment of the pipe-mounted coupler affixed to a vertical mount pipe.

FIG. 10 is a perspective view of one embodiment of the pipe-mounted coupler affixed to a vertical mount pipe. The illustration includes the locking protrusion 44, two connection bridges 43, the stop rim 45, the opening 47, and two accessories, such as coupler 10, as described with reference to FIG. 1. The pipe-mounted coupler 40 is illustrated as being mounted on a pipe 30. The pipe 30 is positioned inside the inner diameter of the pipe-mounted coupler 40, up to the stop rim 45. The stop rim 45 prevents the pipe 30 from sliding further into the pipe-mounted coupler 40. The pipe 30 is illustrated with the pipe opening 31 in at least two positions of the pipe. The two pipe openings 31 are illustrated as being 90 degrees apart around the circumference of the pipe 30. One pipe opening 31 is illustrated as being positioned adjacent to the locking protrusion 44 such that the locking protrusion 44 protrudes into the adjacent pipe opening 31. The locking protrusion 44 is visible through the unused opening 31. The protrusion locks the pipe-mounted coupler 40 in place and prevents the pipe 30 from turning inside the pipe-mounted coupler 40.

In an example using an industry standard drape rod or pipe, the inner diameter of the pipe-mounted coupler 40 is 0.030 inches larger than the outer diameter of the pipe 30. In the example, the outer diameter of a standard pipe 30 is 1.482 inches and the inner diameter of the pipe-mounted coupler 40 is 1.522 inches. The locking protrusion 44 protrudes 0.04 inches outward from the inner diameter of the pipe-mounted coupler 40. In the example, the locking protrusion 44 has a three-degree slope from the edge to the center of the locking protrusion 44.

What is claimed is:

1. A coupler assembly for tubular members, comprising: a coupler supporting accessories to a pipe end, the coupler comprising a circular body with a stop rim positioned at an uppermost surface of the coupler, wherein the stop rim comprises an opening with a smaller inner diameter than a diameter of an inner surface of the circular body, wherein the inner surface of the circular body slides over an outside perimeter of the pipe end until the pipe end meets the stop rim, wherein the circular body comprises a protrusion positioned in an interior of the circular body, wherein the protrusion protrudes inwardly into at least one opening in a sidewall of the pipe end to prevent the coupler from rotating on the pipe end.

2. The coupler assembly of claim 1, wherein the accessories comprise one or more additional couplers to receive terminal connectors connected to drape rods.

3. The coupler assembly of claim 1, wherein the pipe end comprises a set of openings that are disposed in four positions around the pipe end, each opening being 90 degrees apart.

4. The coupler assembly of claim 1, further comprising a second protrusion opposite the protrusion such that both the protrusion and the second protrusion protrude into at least one of the openings.

5. The coupler assembly of claim 1, wherein the coupler has openings on the body 90 degrees from the protrusion to allow openings of the pipe end to be accessed by a rod end hook.

6. The coupler assembly of claim 1, wherein the coupler is made of a polymer material.

7. The coupler assembly of claim 1, wherein the accessories are connected to the coupler by one or more connection bridges.

8. The coupler assembly of claim 1, wherein two accessories are each connected to the coupler by one of two connection bridges, the two connection bridges being affixed on opposing sides of the coupler.

9. The coupler assembly of claim 1, wherein the protrusion is configured to flex when pressure is applied.

10. The coupler assembly of claim 9, wherein the protrusion flexes when the coupler is placed over the pipe end to allow the coupler to slide onto the pipe end.

11. The coupler assembly of claim 10, wherein the protrusion returns to an original unflexed state when the protrusion inserts into the opening.

12. The coupler assembly of claim 1, wherein the protrusion protrudes farther from the body of the coupler in a middle section of the protrusion than on either end of the protrusion.

13. The coupler assembly of claim 1, wherein the stop rim comprises a smaller inner diameter than the outside perimeter of the pipe end to prevent the pipe end from protruding past the stop.

14. A method to couple rods, comprising:
affixing a coupler to support accessories to a pipe end, the coupler comprising a circular body with a stop rim positioned at an uppermost surface of the coupler, wherein the stop rim comprises an opening with a smaller inner diameter than a diameter of an inner surface of the circular body, wherein the inner surface of the circular body slides over an outside perimeter of the pipe end until the pipe end meets the stop rim, wherein the circular body comprises a protrusion positioned in an interior of the circular body, wherein the protrusion protrudes inwardly into an opening of a sidewall of the pipe end to prevent the coupler from rotating on the pipe end.

15. The method of claim 14, wherein the accessories comprise one or more additional couplers to receive terminal connectors connected to drape rods.

16. The method of claim 14, wherein the pipe end comprises a set of openings that are disposed in four positions around the pipe end, each opening being 90 degrees apart.

17. The method of claim 14, wherein the coupler comprises a second protrusion opposite the protrusion such that the protrusion protrudes into the opening and the second protrusion protrudes into a second opening.

18. The method of claim 14, wherein the protrusion is configured to flex when pressure is applied.

19. The method of claim 18, wherein the protrusion flexes when the coupler is placed over the pipe end to allow the coupler to slide onto the pipe end.

20. The coupler assembly of claim 14, wherein the stop rim comprises a smaller inner diameter than the outside perimeter of the pipe end to prevent the pipe end from protruding past the stop.

* * * * *

UNITED STATES PATENT AND TRADEMARK OFFICE
CERTIFICATE OF CORRECTION

| | | |
|---|---|---|
| PATENT NO. | : 12,075,937 B2 | Page 1 of 1 |
| APPLICATION NO. | : 17/099534 | |
| DATED | : September 3, 2024 | |
| INVENTOR(S) | : Philip DiTrolio | |

It is certified that error appears in the above-identified patent and that said Letters Patent is hereby corrected as shown below:

In the Claims

Column 8, Line 25 "coupler assembly" should read --method--.

Signed and Sealed this
Twenty-ninth Day of October, 2024

*Katherine Kelly Vidal*

Katherine Kelly Vidal
*Director of the United States Patent and Trademark Office*